July 28, 1959 P. WELSCHHOF 2,896,286

LOCKABLE SAFETY PIN

Filed April 9, 1956

INVENTOR.
PETER WELSCHHOF
BY
ATTORNEY

United States Patent Office 2,896,286
Patented July 28, 1959

2,896,286

LOCKABLE SAFETY PIN

Peter Welschhof, Rietheim, Kreis Villingen, Germany, assignor of one-half to Paul E. Tobeler, doing business under the name of Trans-Oceanic, Los Angeles, Calif.

Application April 9, 1956, Serial No. 577,156

4 Claims. (Cl. 24—158)

This invention relates to a safety pin which can be locked after it is closed, and more particularly, to a safety pin which provides protection against unintentional opening.

The conventional safety pin consists of a pointed pin side and an opposite or bar side, both of which are engaged in a cap when the pin is closed or latched. The bar is fixed in the cap and the pointed pin side can be latched in the cap or spring-biased to the side thereof. It is removed from the cap by first pushing it laterally inward toward the bar and then, by allowing it to move away from the cap, the spring at the other end of the pin causes the pointed end to move laterally away from the cap. The ordinary cap gives some protection against the involuntary opening of the safety pin, but many times it is opened by an undesired pressure working against the pointed pin side.

According to the present invention, the pointed pin side can be locked in the cap which is slidably engaged on the bar at all times and which is slidably engaged on the pointed pin when the safety pin is closed. When the pin is closed, it is locked by moving the cap on the bar and on the pointed pin longitudinally toward the pin-biasing spring at the other end of the safety pin.

Three embodiments of a lockable safety pin are provided in the present invention. In all embodiments the pointed pin end closes in a conventional inwardly directed, open flap or guide latch means, from which a tube in axial alignment with said flap extends longitudinally toward the top of the cap in the direction away from the spring. To lock the pin, the cap is moved toward the spring and the tube is thereby moved to surround the pinpoint end by which the latter is held locked against any unintentional movement that would tend to open the pin. The locking means in the cap further comprises a pipe on the opposite side of the cap from the tube and in which the bar is slidably engaged. The bar extends beyond the pipe in each case and is deflected in one embodiment so that its end extends into a hole in a surface of a cap, which provides a holding device when the pin is in the locked position.

In the other two embodiments, the extension of the bar within the cap is deflected generally downward, juxtaposed with a transverse surface of the cap, and then is bent around the lower edge of the cap and juxtaposed to the reverse side of said surface. It is further deflected at the upper edge of the cap, either over the edge or into an indentation in the upper edge. The pin is held in the locked position, after the cap is moved longitudinally on the bar and on the pointed pin, by the snug friction fit of the two deflected portions of the bar against the two opposite surfaces of the cap and by the deflection over the upper edge or into the latter indentation.

It is, therefore, an object of this invention to provide a safer safety pin.

A principal object of this invention is to provide safety pins having locking means in the cap.

A further object of this invention is to provide safety pins in which the bar is slidably engaged in the cap and in which the bar is deflected in the cap so as to cause the pin to be held in its locked position.

A still further object of this invention is to provide a safety pin in which the pointed pin is slidably engaged in the cap so that the cap can be moved longitudinally toward the spring, thereby locking the pointed pin against any opening movement.

Other objects of invention will become apparent from the following description taken in connection with the accompanying drawings, in which Fig. 1 is a front elevational view of the first embodiment of the invention in the locked position;

Figure 1:
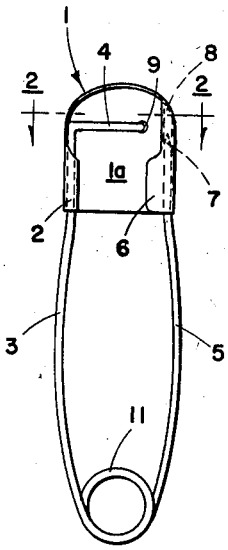
Figure 2:
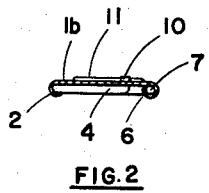
Fig. 2 is a view taken along the line 2—2 of Fig. 1.
Figure 3:
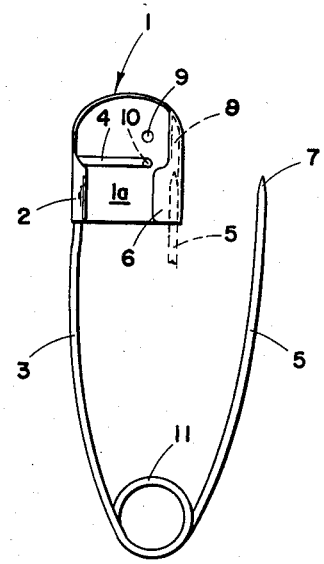
Fig. 3 is a front elevational view of the pin shown in Fig. 1 in the open position.

Referring to Figs. 1–3, which illustrate the first embodiment of the present invention, conventional pin-biasing spring 11 is at the lower end of the safety pin and connects adjacent ends of bar 3 and pointed pin side 5. Cap 1 is longitudinally disposed at the other end of the pin. Pointed pin side 5 of the safety pin is in the closed and locked position, having point 7 engaged in locking tube 8, and bar on opposite side 3 is slidably engaged in sleeve 2, extending into cap 1 beyond sleeve 2. Deflected portion 4 of bar 3 has been bent at an approximate right angle to the longitudinal portion of bar 3 and extends transversely in the direction of pointed pin side 5 toward a re-entrant portion or hole 9 in surface 1a of cap 1. Bar 3, extending from deflected portion 4, is deflected a second time at an approximate right angle to portion 4 in the direction toward the reverse surface 1b of cap 1, and this second deflected portion 10 extends into or through re-entrant portion or hole 9 in cap 1 to the reverse side 1b. When deflected portion 10 extends through hole 9, the safety pin is locked against opening.

To unlock the safety pin shown in Fig. 1, cap 1 can be taken into one hand and spring 11 into the other hand, and the cap should be moved by a twisting motion so that bar 3 is moved toward the holder and side 5 is moved away from the holder. Such movement will move portion 10 out of hole 9 and when this has been accomplished, the cap can then be moved longitudinally away from spring 11 so as to withdraw tube 8 from over pointed end 7. The safety pin is then in the position of an ordinary closed one, point 7 being in guide latch means or flap 6, and it can be opened by moving side 5 around and out of lip 6 in the usual manner.

When the safety pin, shown in Fig. 3 is closed and not locked, as indicated by the pin point 5 in broken lines, to lock the pin, the cap is merely moved on bar 3 and side 5 toward spring 11 until end portion 10 of bar 3 moves into hole 9. When that occurs, the safety pin is locked against opening, as point 7 is then in tube 8, and cannot be removed therefrom without removing portion 10 from hole 9.

Figure 4:
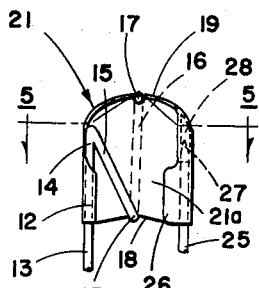
Fig. 4 is a front elevational view of the cap of the second embodiment of the invention in the locked position.
Figure 5:
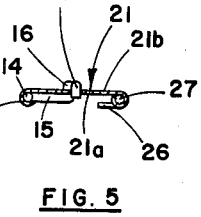
Fig. 5 is a view taken along the line 5—5 of Fig. 4.
Figure 6:
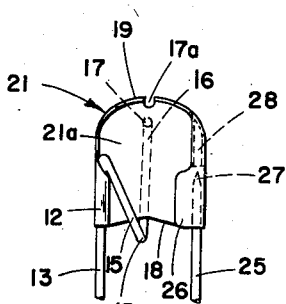
Fig. 6 is a view of the embodiment shown in Fig. 4 in the closed but unlocked position.

Referring to Figs. 4—6, which illustrate the second embodiment of the invention, cap 21 is constructed similarly to cap 1, above, in that it has a sleeve 12 in which bar 13 is slidably engaged, and has the conventional type flap or lip 26 into which pin point side 25 is inserted to close the pin. Longitudinally in alignment with side 25, which is biased against the edge of cap 21 when fitted under flap 26, is tube 28 into which pin point 27 moves when the spring is moved toward the cap. In this embodiment, however, bar 13 is deflected downward, toward the spring and lower edge 18 of cap 21, at an acute angle formed by portion 14, extending into cap 21 beyond sleeve 12, and by deflected portion 15. Portion 15 is in spring contact against surface 21a of the cap, and is further bent around edge 18 where it is extended as portion 16 on reverse surface 21b of the cap. Portion 16 is in spring contact with surface 21b and it terminates in tip 17 which is formed by bending portion 16 in the direction of the cap toward surface 21a. The safety pin is in the locked position when cap 21 has been moved toward the spring, loop 15a between portions 15 and 16 has contact with lower transverse edge 18, and tip 17 has been snapped into opening or indentation 17a in upper edge 19 of cap 21. Tip or end portion 17 is sprung into opening 17a, but the tension is slight, and it is snapped out when cap 21 is pulled in the direction away from the safety pin spring.

In Fig. 6, the safety pin is shown in the closed but unlocked position, cap 21 having been pulled away from the spring. In this position, pin point 27 has been removed from tube 28 and the pin can be opened by merely pushing point 27 transversely inward and around flap 26. Tip 17 is sprung against side 21b of the cap, and to lock the safety pin, it is merely necessary to push the cap toward the spring until tip 17 snaps into cut away portion 17a.

Figure 7:
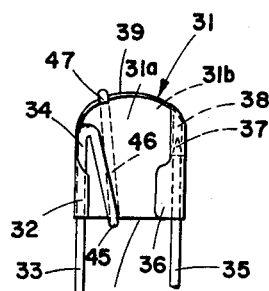
Fig. 7 is a front elevational view of the cap of the third embodiment in the locked position.
Figure 8:
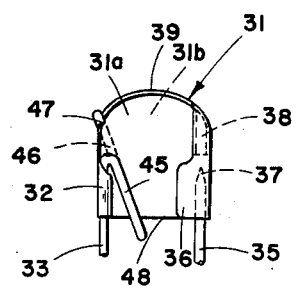
Fig. 8 is a view of the embodiment shown in Fig. 7 in the closed but unlocked position.

In Figs. 7 and 8, the third embodiment is shown. This embodiment is very similar to the second embodiment in that bar 33 is slidably engaged in sleeve 32 of cap 31. Extending into cap 31, beyond sleeve 32, is extension 34 of bar 33, forming an acute angle with deflected portion 45 which extends down to the lower edge 48 of the cap. Bar 33 is further extended, being bent around edge 48, as deflected portion 46. Portion 46 extends toward the top transverse edge 39 of the cap, where it terminates in an approximate U-bend 47, which is bent over the edge of the cap away from surface 31b and toward surface 31a. Deflected portions 45 and 46 are in spring contact with surfaces 31a and 31b, respectively. In this embodiment, when the safety pin is in the locked position and pin point side 35 has its end 37 in tube 38, the deflected portions of bar 33 are situated between the longitudinal center of the cap and its left hand side which forms the exterior of sleeve 32. To unlock the pin, as is shown in Fig. 8, bend 47 is moved in the left hand direction of the drawing. This permits cap 31 to be moved away from the spring, not shown, and in the upward direction to cause tube 38 to be moved away from pin point 37. To lock the pin, the cap is merely moved in the reverse direction, that is, downward in the drawing, toward the spring of the safety pin.

From the above description it is apparent that several novel features in safety pins have been provided, and a really safe safety pin has been created.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A safety pin comprising a cap, a pointed pin, a bar extending alongside said pin, pin-biasing spring means connecting adjacent ends of said pin and bar, said bar longitudinally and slidably engaged in a sleeve adjacent a longitudinal edge of said cap, said pointed pin adapted to close in guide latch means in said cap, said pin being longitudinally and slidably engaged in said latch means when said safety pin is closed, a tube in said cap longitudinally aligned with said latch means, said tube extending beyond said latch means in the direction away from said spring, a portion of said bar extending through and beyond said sleeve in the direction away from said spring, said portion being first deflected toward said pointed pin and being secondly deflected toward and having its end against a transverse surface of said cap between the longitudinal axes of said sleeve and said tube, and a hole in said surface of said cap in longitudinal alignment with said end of said portion against said cap; whereby when said cap is moved slidably toward said spring on said bar and said pointed pin, said end of said bar portion will be moved into said hole and said pointed pin will be moved into said tube so as to lock said safety pin.

2. In a safety pin, a cap, a pointed pin, a bar extended along side said pin, pin-biasing spring means connecting adjacent ends of said pin and bar, said bar slidably engaged in a sleeve adjacent a longitudinal edge of said cap, said pointed pin connected to fit into said cap and to close said safety pin, a tube in said cap in alignment with said pointed pin when said safety pin is closed and into which said pointed pin extends when said cap is moved slidably on said bar toward said spring means, a first portion of said bar extending through and beyond said sleeve and deflected toward said pointed pin inwardly of said longitudinal edge, said first portion being juxtaposed to a surface of said cap, a second portion of said bar extending from said first portion and being deflected toward said surface of said cap, and a re-entrant portion in said surface inwardly of said edge, said second portion extending into said re-entrant portion when said pointed pin extends into said tube.

3. In a safety pin, a cap, a pointed pin, a bar extending along side said pin, pin-biasing spring means connecting adjacent ends of said pin and bar, said bar slidably engaged in a sleeve adjacent a longitudinal edge of said cap, said pointed pin connected to fit into said cap and to close said safety pin, a tube in said cap in alignment with said pointed pin when said safety pin is closed and into which said pointed pin extends when said cap is moved slidably on said bar toward said spring means, a first portion of said bar in said cap, said first portion extending through and beyond said sleeve in the direction away from said spring, a second portion of said bar in said cap extending from said first portion and being deflected therefrom toward said spring and inwardly of said longitudinal edge, said second portion juxtaposed to a first surface of said cap and extending to one edge of said first surface in the direction of said spring, a third portion of said bar extending from said second portion, said third portion being deflected around said one edge to the reverse surface of said first surface and being extended along said reverse side away from said spring toward the opposite edge of said surface, an end portion extending from said third portion of said bar and deflected against said reverse side, and an indentation in said reverse side in position to receive said deflected end portion when said cap is moved toward said spring means.

4. In a safety pin, a cap, a pointed pin, a bar extending along side said pin, pin-biasing spring means connecting adjacent ends of said pin and bar, said bar slidably engaged in a sleeve adjacent a longitudinal edge of said cap, said pointed pin connected to fit into said cap and to close said safety pin, a tube in said cap in alignment with said pointed pin when said safety pin is closed and into which said pointed pin extends when said cap is moved slidably on said bar toward said spring means, a first portion of said bar in said cap, said first portion extending through and beyond said sleeve in the direction away from said spring, a second portion of said bar in said cap extending from said first portion and being deflected therefrom toward said spring and inwardly of said longitudinal edge, said second portion being situated between said longitudinal edge of and the longitudinal center of said cap and being juxtaposed to a first surface of said cap, said second portion extending to one transverse edge of said first surface in the direction of said spring, and a third portion of said bar extending from said second portion, said third portion being deflected around said one transverse edge to the reverse side of said surface and being extended along said reverse side away from said spring to the opposite transverse edge of said surfaces, said third portion being situated between said longitudinal edge of and the longitudinal center of said cap, said third portion terminating in a U-bend extending over said opposite edge of said surfaces toward said first surface.

References Cited in the file of this patent
UNITED STATES PATENTS

| | | |
|---|---|---|
| 354,830 | Freeman | Dec. 21, 1886 |
| 1,019,578 | Wright | Mar. 5, 1912 |
| 2,132,038 | Mizer | Oct. 4, 1938 |
| 2,233,247 | Dies | Feb. 25, 1941 |
| 2,292,687 | Ford | Aug. 11, 1942 |
| 2,429,337 | Abbott | Oct. 21, 1947 |